July 18, 1972  E. PLUMAT  3,677,729
CHEMICAL TEMPERING PROCESS FOR GLASS BY SPRAYING
Filed Sept. 9, 1969  4 Sheets-Sheet 1

INVENTOR
Emile Plumat
BY Spencer & Kaye
ATTORNEYS

INVENTOR
Emile Plumat
BY Spencer & Kaye
ATTORNEYS

United States Patent Office 3,677,729
Patented July 18, 1972

3,677,729
CHEMICAL TEMPERING PROCESS FOR GLASS BY SPRAYING
Emile Plumat, Gilly, Belgium, assignor to Glaverbel S.A., Watermael-Boitsfort, Belgium
Filed Sept. 9, 1969, Ser. No. 856,299
Claims priority, application Luxembourg, Sept. 12, 1968, 56,873
Int. Cl. C03c 21/00
U.S. Cl. 65—30                                    17 Claims

ABSTRACT OF THE DISCLOSURE

A process and apparatus for chemically tempering a body of a material amendable to such treatment by disposing the body in a non-liquid environment, and projecting against the body a continuous supply of a liquid tempering medium at a flow rate sufficient to cause a continuous stream of the medium to flow across the surfaces to be tempered.

BACKGROUND OF THE INVENTION

The present invention relates to a process for strengthening bodies made of glass, vitrocrystalline material, ceramic or stone, and to apparatus for use in the performance of such process.

It is known that the tensile strength of a glass article is usually lower than that which the article should theoretically possess on the basis of its cross-sectional dimensions. It is also known that the tensile strength can be greatly improved by tempering the glass, i.e., by establishing or increasing compressive surface stresses in the glass.

A body of glass or vitrocrystalline material can be tempered by causing a substance to enter the body from a contacting medium, provided the temperature during and after such entry is appropriately controlled. Usually, this so-called chemical tempering involves the entry of ions into the body in exchange for other ions. For example, compressive surface stresses in glass can be set up or increased by replacing ions in the exterior layers of the glass with ions which confer a lower coefficient of thermal expansion on such exterior layers, the exchange being effected above the strain point of the glass and the glass being subsequently allowed to cool. Alternatively, surface compressive stresses can be set up or increased by replacing ions in exterior layers of the glass with larger ions while the surface layers of the glass are at an elevated temperature which, however, is too low to allow complete stress relaxation during the time the glass is maintained at such temperature, and then allowing the glass to cool.

Chemical tempering need not necessarily involve an ion exchange. Thus, it is possible to create or increase the surface stresses by causing ions to enter the glass from a contacting medium under the influence of an electric field, without comparable movement of ions from the glass into the contacting medium through the surface via which ions enter the glass. It is also possible to create or increase the surface stresses by causing atoms or molecules to enter the glass from a contacting medium.

The term "chemical tempering" where used herein applies to all such processes. Such processes can be applied not only to glass and vitrocrystalline material, but also to ceramic or stone, provided there is a sufficiently uniform distribution of a vitreous phase or phases at the surface of the material to permit surface compressive stresses to be set up or increased by the introduction or exchange of ions as referred to.

According to the available literature, chemical tempering is performed by immersing the article to be tempered in a bath of liquid treating medium for a certain period of time. This, so far as I am aware, is the accepted and only recognized procedure in the chemical tempering art. The procedure enables the tensile strength of the treated products to be greatly improved and in recent years much research has been devoted to further improving and refining the bath treatment technique.

In the bath treatment process it is necessary, if a predetermined uniform stressing of the surface of the article is to be achieved, to exercise great care to maintain the homogeneity of the composition of the liquid in immediate contact with the article, and some of the recent research has been concerned with this problem. An associated problem is that of avoiding an increase in the diffusion barrier at the article-bath interface which tends to slow down or even terminate prematurely the entry of ions into the article.

SUMMARY OF THE INVENTION

It is a primary object of the present invention to avoid these drawbacks and difficulties.

Another object of the invention is to improve the chemical tempering of glass and vitrocrystalline bodies.

A more specific object of the invention is to improve the uniformity of the chemical tempering of such bodies.

The present invention involves a radical departure from the recognized chemical tempering procedure. It is based on my quite unexpected discovery that considerable improvements can be realized by delivering the liquid treating medium to the article in such a manner as to cause the medium to flow or stream continuously across the surfaces in which compressive stresses are to be produced or existing compressive stresses are to be increased. Both the production of compressive stresses where none existed before and the increasing of existing compressive stresses will be referred to hereinafter as "creating compressive stresses."

By making use of the different technique now proposed according to the invention, these problems can be avoided. Uniform treatment can be very easily achieved and the treatment can be more easily controlled. The new technique moreover affords very considerable advantages over the old one in mass production processing. Articles to be processed can be tempered while passing through a tempering plant of small dimensions.

The new procedure can be applied in the tempering of glass, vitrocrystalline material, ceramic and stone. The process can be applied for treating the whole or part of an article composed of any of these materials. For example, the invention can be applied for strengthening the edges or marginal portions of glass sheets. The process can also be applied for treating a body of glass, vitrocrystalline material, ceramic or stone constituting part of an article, e.g., the treated body may be a coating on a substrate. In the latter case the tempering treatment may introduce compressive stresses only in an external layer at the exposed surface of the body.

The objects according to the invention are achieved, in a process for chemically tempering a body of glass, vitrocrystalline material, ceramic or stone by contacting the body with a liquid treatment medium from which at least one substance enters the body, while controlling the temperature of the body so as to cause such entry to create compressive surface stresses in the body, by the improvement wherein the step of contacting is carried out by causing a continuous stream of the medium to flow across the body.

The invention also includes chemical tempering apparatus composed of liquid discharge means for delivering a continuous flow of liquid into a predetermined region, means for supporting a body which is to be chemically tempered in such region so that liquid from the discharge means streams across such body, means connected to the discharge means for delivering thereto a liquid treatment medium containing a substance which will enter the body when the medium contacts the body, thereby to create compressive surface stresses in the body, and a tank disposed for receiving liquid after it has streamed across the body.

BRIEF DESCRIPTION OF THE DRAWINGS

FIG. 3 is a cross-sectional, elevational view taken along the line 3—3 of FIG. 1a.

DESCRIPTION OF THE PREFERRED EMBODIMENTS

Figure 1A:
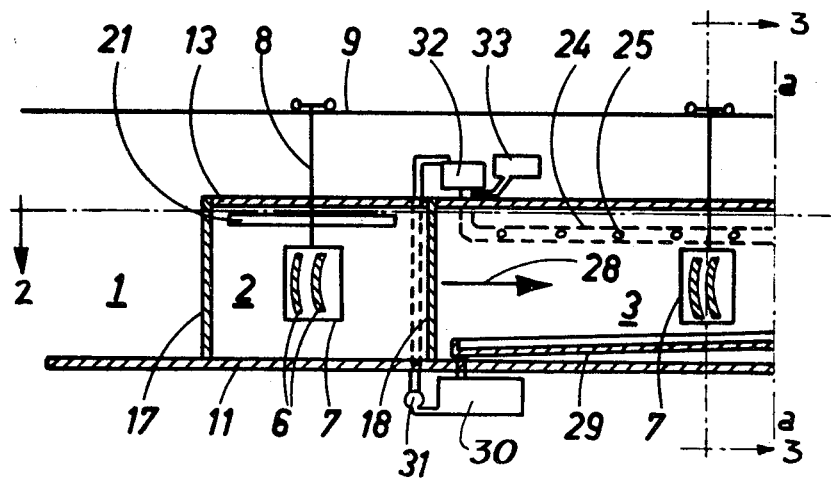
FIGS. 1a and 1b show, in two parts divided along line a—a, an elevational, cross-sectional view along the line 1—1 of FIGS. 2a and 2b, of apparatus for practicing the present invention.

The present invention, as broadly defined, includes any process wherein at least part of a body of glass, vitrocrystalline material, ceramic or stone is strengthened by contacting at least part of the body with a liquid medium from which at least one substance enters the body, the temperature during and after such entry being controlled, whereby compressive surface stresses are set up or increased in that part of the body, and wherein the liquid medium is continuously supplied to and streams along the body.

The uniformity of the treatment according to the invention has been found to be realizable even with a non-uniform delivery of liquid treating medium to the surface area to be strengthened. For example, if the liquid is sprayed or sprinkled onto the surface and the liquid forms on the surface a film of liquid flowing continuously over the surface, the rates of discharge of liquid from different spray or sprinkler orifices may differ somewhat from one another without creating a significant variation in the tempering effect from one part of the surface to another.

The improved uniformity is evident in the lower incidence of breakage which has been observed when treating glass sheets. When applying the known immersion method, breakage sometimes occurs at the edges or margins of the sheets due to a difference in the concentrations of ions entering the sheets at or near their edges on the one hand and at more central regions of the sheets on the other hand. It appears that when streaming the liquid medium along the surface in accordance with the invention, these variations in concentration do not occur, or at least not to the same extent. Whatever be the precise reason for this, very little, if any, breakage occurs in practice.

Advantageously, the streaming of the liquid medium is achieved by disposing the body to be treated in the zone of action of at least one jet of the medium. When treating a sheet, the energy of the jet or jets can increase the momentum of the liquid flowing along the surface so that the liquid spreads around the edges of the sheet. In this way any risk of breakage can be even further reduced.

Advantageously, the body to be treated moves through at least one jet or stream of the liquid medium. This promotes the strengthening of all peripheral parts of the body, for instance the edges in the case of a sheet.

According to another advantageous feature, at least one relative reciprocating movement is created between the source from which the liquid issues and the body to be treated. This promotes the homogeneity of the treatment of the body and, for treating articles of a given size, enables the treatment station to be smaller and/or the number of jet or sprinkler heads to be smaller than would otherwise be required.

Advantageously, the or each relative reciprocating movement is performed transversely to the direction in which the body to be treated moves through the jet or stream of liquid medium. This combination of movements promotes uniformity of streaming not only over the whole length or height of the body to be treated but also over its whole width and enables the number of delivered jets of liquid required for treating a body of a given size to be reduced.

In another advantageous embodiment of the process according to the invention, the body is moved through at least one jet or stream of the liquid medium and a relative reciprocating movement is produced parallel to the direction of movement of the body. This step also promotes uniformity of treatment within a treatment space having a given size.

In the performance of the invention in any of the ways hereinbefore described, the treatment can, if so required, differ in a predetermined manner from one region of the body to another. Advantageously, for instance, different portions of the surface of the body to be treated are contacted with different amounts of the liquid medium per unit time. Among other advantages, this step enables the magnitude of the stresses induced adjacent the lateral edges of a sheet to be specially selected to minimize the risk of breakage at the marginal areas of the sheet. Moreover, this method enables differential tempering to be performed so that an article, for instance a glass windshield for a motor car, can have vision safety zones such that, if the windshield should break, the glass will not fracture into such small portions as to obscure the driver's forward vision.

In another advantageous embodiment of the process according to the invention, different portions of the surface of a body to be treated are contacted by streaming liquids having respectively different diffusion characteristics. The quantities of liquid contacting the body at different places may differ, e.g. with regard to temperature, the concentration or even the nature of exchange ions, the nature or concentration of any adjuvants used to promote the diffusion of ions into the body, or the acidity or basicity of the medium. By varying any one or more of these characteristics the distribution of the intensity or nature of the ion diffusion over the surface of the body can be adapted to the particular result desired. For instance, one surface of a flat article can be more strongly tempered than another, or differential tempering can be performed inside a hollow article. If the substances entering the article impart color to it, different parts of the article can be given different colors.

Advantageously, the streaming is performed in the presence of a gaseous fluid having at least one component which influences the diffusion of one or more substances into the body being treated. I have found that by this means the speed of the tempering treatment can be considerably increased. It is probable that in some of the cases in which such accelerated treatment occurs, the combination of the streaming liquid and the gas produce a nascent chemical compound whose reactivity is higher than that of the same compound when aged. By using such a gaseous fluid the composition of the medium in contact with the article can be changed by chemical reaction between the liquid medium and the gaseous fluid without requiring any modification of the liquid substance discharged by the jet or spray head or heads.

Advantageously, use is made of a gaseous fluid containing a component that weakens the diffusion barriers which oppose the entry of substances into the body to be treated. Although the exact mechanism by which many of these components produce this effect is unknown, it is known that these components lower the resistance offered to diffusion so as to increase the quantity of ions diffusing into the body during a given time.

It has been observed that during chemical tempering by ion exchange in a chemical tempering bath, the diffusion of ions from the liquid medium into the body becomes impeded by the replaced ions, which migrate from the body into the liquid medium. In numerous experiments, diffusion stopped when the concentration of replaced ions in the liquid medium was still very low, so that the article remained inadequately tempered.

This opposition to diffusion is much less troublesome when performing a chemical tempering treatment according to the invention, but it is not entirely absent. As the liquid medium flows along the surface there is some enrichment of the liquid medium in replaced ions and consequently some strengthening of the diffusion barrier along the surface in the direction of flow of the liquid medium. It is therefore advantageous to add, by means of the gaseous fluid, an adjuvant which weakens this barrier.

Advantageously, the adjuvant is chosen from the following group: $H_2O$, $CO_2$, $SO_2$, $SO_3$, and any one of the halogens. These substances enable the acidity or basicity of the medium in contact with the surface to be modified and thus enhance the diffusion to a considerable extent.

Advantageously, the gaseous fluid is given a movement relative to the body to be treated. For instance, the gaseous fluid can be blown onto the surface of the body, e.g. from outside the enclosure in which the treatment is performed, or the gas can be displaced by means of a fan disposed adjacent the body. The gas current or currents can be such as to aid in spreading the liquid treating medium as a film over the surface or surfaces to be treated and/or to enhance the streaming of the liquid along such surface or surfaces, or along a particular part or parts thereof, e.g. in the case of a sheet, along its marginal areas and peripheral or lateral edges. Thus, the gaseous fluid can itself serve further to reduce the risk of breakage of the articles treated.

According to another advantageous embodiment of the process, the streaming of the liquid medium is performed in the presence of a gaseous fluid which controls the temperature of the treatment. The gaseous fluid can so control the diffusion temperature as to cause it to vary across the surface or surfaces being treated. It is also possible, by means of a gaseous medium, to accelerate the treatment by increasing the treatment temperature for a short time to a value above that at which the salt or other active ingredient of the liquid treating medium would decompose if it were maintained at that temperature for a longer time, as would be the case if the liquid medium were heated before being fed to the surface to be treated or if the liquid were used as a bath.

Advantageously, during the streaming, the liquid medium and the body to be treated are at least partially subjected to the action of an electric field. An electric field can serve to accelerate the entry of a substance into the body from the liquid medium. Ion diffusions can thus be performed 10 or even 100 times more quickly than in the absence of an electric field.

The electric field may be an alternating field or it may have an alternating component. By means of such a field, an ion exchange can be promoted simultaneously at two opposite surfaces of a body.

Advantageously, the liquid treating medium is recovered after streaming along the body and is then recycled. A small quantity of the liquid is therefore sufficient to perfom the treatment. It will therefore be apparent that in the event of damage to the installation used for performing the process there is not in any case likely to be the considerable loss of liquid medium which is liable to occur in the immersion type tempering process.

Also advantageously, the liquid medium is regenerated, or purified, before being recycled. Such regeneration is desirable because in most cases during the streaming of the liquid medium across the bodies being treated, the medium becomes somewhat enriched in ions leaving the bodies and becomes somewht depleted in the ions which it is desired to introduce into the bodies. The liquid medium is therefore advantageously regenerated, or purified, by removing ions deriving from the bodies treated and adding ions to be introduced into the bodies, in the required concentration. Recycling and regeneration is more particularly desirable of course in industrial plants wherein articles are treated on a mass production basis.

The invention also includes apparatus for carrying out a process as hereinbefore defined.

To produce a relative movement between the body or bodies to be treated and the jet or stream of molten salt or other liquid medium, the apparatus can comprise means for moving the liquid discharge head along an endless curved path. This feature is helpful in enabling the whole extent of a sheet or other body to be uniformly treated.

Preferably, the tank forms the bottom of a chamber containing the or each liquid discharge head and the supporting means for the or each body to be treated. There will then be no loss of some of the treatment medium over the top edge of the tank. Moreover, the treatment takes place in a space which is protected against random currents in the atmosphere surrounding the apparatus.

Advantageously, the tank is connected to a recycling circuit which supplies the liquid discharge head, so as to promote economy of comsumption of treatment liquid. It is also possible to include in the recycling circuit a regenerator which removes from the liquid medium ions deriving from the bodies being treated and restores the required concentration of the substance which is to enter the bodies, and of any adjuvant used.

The apparatus advantageously also comprises means for supplying a gaseous fluid. Such means can be formed by a row of blowers or a single blower, or by pipes connected to a reservoir containing the gas or gases; such means can also comprise means for heating the gas or gases. Such an apparatus enables the streaming of liquid medium over the bodies being treated to take place in the presence of a gaseous fluid which influences the diffusion conditions. These conditions can be modified, for instance, by varying the nature of the gas, its temperature or its flow rate, either with respect to time or space.

Preferably, the means for supporting the or each body to be treated comprises a conveyor mechanism which enables the bodies to be conveyed from a loading zone, through a zone where the treatment with liquid medium takes place according to the invention, and to a delivery zone where the bodies can be removed. The conveyor may if desired convey the bodies through a pre-treatment zone after leaving the loading zone and/or through a post-treatment zone following the treatment with the liquid medium from which the diffusion takes place.

Certain exemplary embodiments of the invention, selected by way of example, will now be described.

Example 1

Vertically disposed sheets of soda-lime glass made from the following composition:

| | Percent |
|---|---|
| $SiO_2$ | 72 |
| $Al_2O_3$ | 3 |
| $Na_2O$ | 13 |
| $CaO$ | 12 | were sprinkled with molten potassium nitrate from a sprinkling head formed of a straight cylindrical pipe located horizontally above the sheets and rotating about its axis. The sprinkler pipe had ten holes per cm., disposed in a helical line along the pipe. Each hole had a diameter of half a millimeter. The amount of salt supplied per hole was one liter every 5 minutes. The treatment, which was performed at 450° C., was continued for 24 hours. The liquid used was constantly recycled.

The sprinkler pipes are disposed parallel to the horizontal edges of the sheets. The pipes were 10 cm. longer than the width of the sheets, in order to realize a substantial flow of the molten nitrate along the vertical edges of said sheets.

The mechanical strength of the sheets treated reached 105 kg./mm.$^2$, compared with 6 kg./mm.$^2$ before treatment. None of the one hundred sheets so treated broke. In a comparative treatment test in a bath of potassium nitrate, six sheets out of a hundred broke. The breakage often started at the lateral edges of the sheets which were disposed vertically in the bath.

Example 2

Vitroceramic sheets 60 cm., in height and 120 cm. in width and prepared from the following composition:

| | Percent |
|---|---|
| $SiO_2$ | 48 |
| $Al_2O_3$ | 32 |
| $Na_2O$ | 10 |
| CaO | 2 |
| $TiO_2$ | 8 | were sprinkled for seven hours with potassium nitrate at 510° C. from sprinkler pipes similar to that described in Example 1. From the commencement of sprinkling, a current of $CO_2$ was blown obliquely upwards from below the sheets onto the vitroceramic sheets for five hours at a rate of 10 liters per minute. Then, for the remaining period of two hours during which the sprinkling of potassium nitrate continued, $SO_3$ was blown onto the sheets at the rate of 5 liters per minute. None of the 50 sheets thus prepared broke, but three sheets of a batch of 50 sheets broke when treated in a bath of $KNO_3$ at the same temperature. Moreover, the blowing of currents of gas containing a component, such as $CO_2$ or $SO_3$, which weakened the diffusion barrier, considerably enhanced the penetration of the $K^+$ ions into the sheets. A depth of penetration of 60 microns was observed after the seven hours of the treatment, whereas in a comparative test 25 hours of treatment were required to produce the same penetration in the absence of the gaseous fluid.

Example 3

Pieces of ceramic made from the following composition:

| | Percent |
|---|---|
| $Al_2O_3$ | 42 |
| $SiO_2$ | 46 |
| $Na_2O$ | 12 | were subjected to jets of $KNO_3$ from a sprinkling head. The treatment temperature was 520° C. and the treatment lasted 24 hours. The mechanical strength of the samples after the treatment was four times higher than that of untreated pieces. In this case, also, breakage commencing in the marginal areas decreased to 2% compared with 5% for pieces treated for the same period of time and at the same temperature in a bath of $KNO_3$.

Example 4

A piece of nepheline ($Na_3KAl_4Si_4O_{16}$) was treated for 10 hours with jets of $KNO_3$ from a sprinkling head. The treatment temperature was 510° C. It was found that the mechanical strength of the sample was substantially enhanced by the treatment. The depth of penetration of $K^+$ ions into the sample reached 25 microns. Breakage starting at the marginal areas had been reduced by the treatment from 4 to 2% compared with identical pieces treated in a bath of liquid medium.

Example 5

Sheets of glass made from the same composition as those in Example 1 were treated with jets of 2% $LiNO_3$ and 98% $NaNO_3$ kept at 580° C. Treatment lasted for 20 minutes and the sheets were then slowly cooled. The mechanical strength of the sheets after the cooling was 14 kg./mm.$^2$. Breakage starting in the marginal areas was reduced from 3 to 1% as compared with that which occurred in comparative tests in which identical sheets were treated in a bath of the same liquid treatment medium.

Example 6

A sheet of soda-lime glass measuring 1.30 m. by 56 cm. was held vertically and potassium nitrate was discharged downwardly onto the sheet from an overhead spray tube. The molten salt was discharged continuously onto the sheet at a temperature of 460° C. for a period of one hour. During this treatment, two steel plates were held adjacent opposite sides of the glass sheet, each plate being spaced 1 mm. from the facing glass surface so as to allow the films of potassium nitrate to flow down continuously along the glass surfaces between these surfaces and the steel plates. The plates were throughout the treatment connected to a source of E.M.F. the polarity of which was reversed 240 times in the one hour period. The current density was maintained at 2 ma./cm.$^2$. Although the treatment lasted for only one hour, potassium ions penetrated into the glass up to a depth of 35 microns from each of the two surfaces of the sheet. Due to the streaming of the treatment medium along the glass surfaces the tempering action was very uniform over the whole area of the sheet.

The treatments disclosed in Examples 1 to 6 can be performed in apparatus as shown diagrammatically in FIGS. 1–4.

Figure 1B:
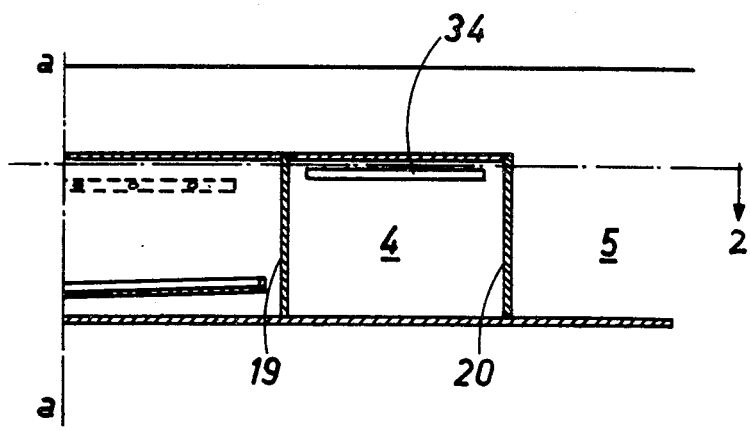
Figure 2A:
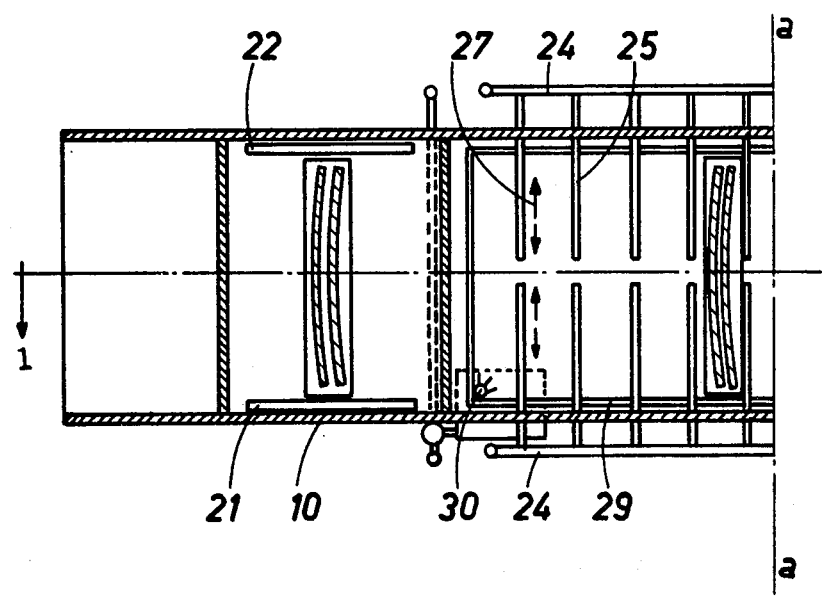
FIGS. 2a and 2b show, in two parts divided along line a—a, a cross-sectional plan view along the line 2—2 of FIGS. 1a and 1b.
Figure 2B:
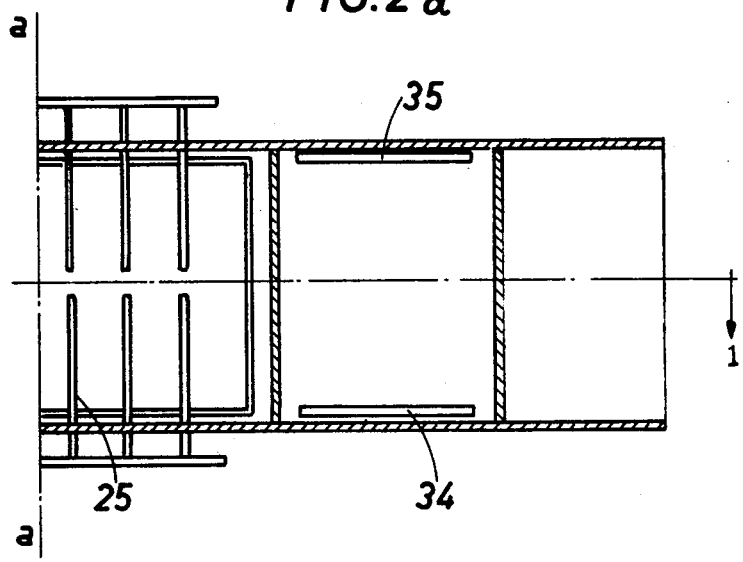
Figure 3:
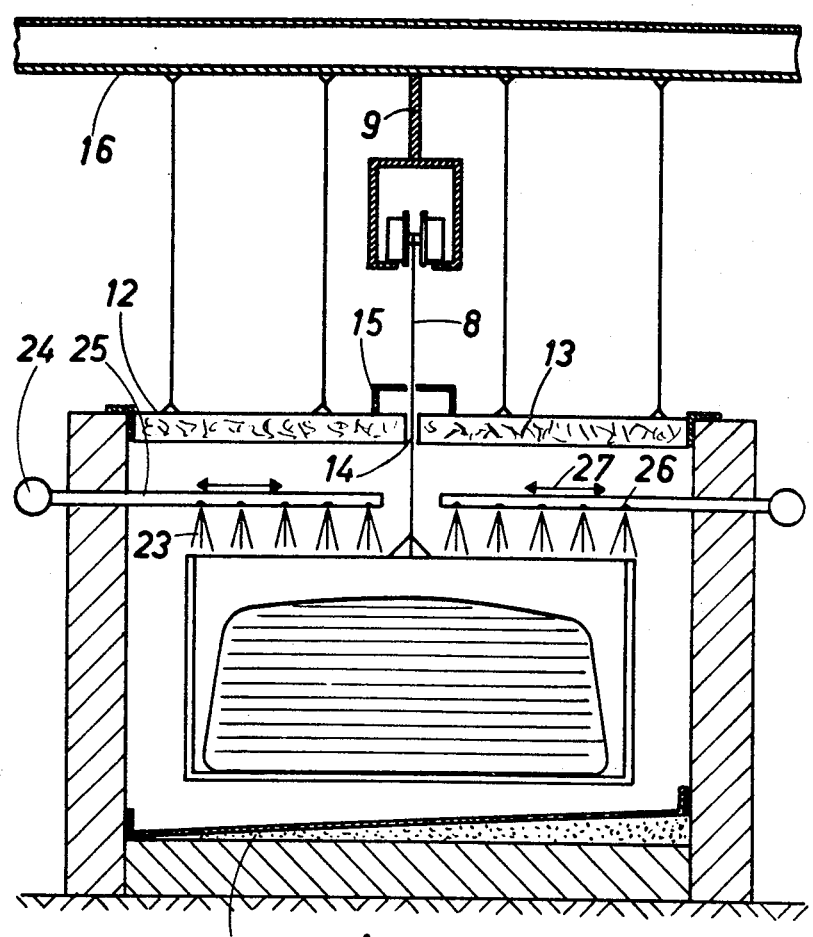

The apparatus shown in FIGS. 1–3 includes the following five compartments: a loading compartment 1, a preheating compartment 2, a diffusion treatment compartment 3, a cooling compartment 4 and an unloading compartment 5. Sheets of glass 6 move through the compartments 1–5 in baskets 7 suspended by means of cables 8 from a rail 9 extending longitudinally above the five successive compartments. The mechanism for driving the baskets 7 is not shown. The three central compartments 2, 3 and 4 are formed by side walls 10, bottom 11 and two cover portions 12 and 13, all of stainless steel. The walls of the loading compartment 1 and the unloading compartment 5 can be made of less expensive materials since these compartments are exposed to no risk of deterioration by chemical attack.

The two cover portions 12 and 13 of the three central compartments are separated, as shown in FIG. 3, by a gap 14 through which the attaching cables 8 extend. A hermetic seal 15, constructed in a known manner, prevents any significant leakage of gas through the gap 14. The two semi-covers 12 and 13 and the rail 9 are suspended from five beams 16 which extend transversely of the apparatus and are spaced along its length. The various compartments are separated from one another by mobile partitions 17, 18, 19 and 20 of stainless steel. The partitions are vertically or horizontally moved or pivoted by any suitable type of mechanism.

After the articles 6 are placed in a basket 7 in the loading compartment 1, the mobile partition 17 is temporarily opened and the sheets of glass 6 are carried into the preheating compartment 2, after which partition 17 closes. In the compartment 2, the sheets are heated by radiant resistance heaters 21 and 22 until the sheets reach the temperature at which the diffusion treatment is to be performed. In the example under discussion, the temperature is 470° C. After the time required for this preheating, the partition 18 is temporarily opened, the basket moves forward into the diffusion compartment 3, and partition 18 closes.

In the compartment 3 liquid treatment medium is sprinkled or sprayed onto the sheets of glass, as indicated at 23 in FIG. 3. The treatment medium is, for example, molten potassium nitrate. This medium is supplied by means of a large diameter distributing pipe 24 connected to sprinkler, or spray, tubes 25 provided with spray holes 26. Via a mechanism (not shown) the sprinkler tubes 25 are given a lateral reciprocating movement in the direction indicated by the arrows 27 of FIGS. 2a and 3, so that the spray orifices move laterally to and fro in relation to the sheets of glass. At the same time, the sheets of glass are carried slowly forward within the diffusion compartment 3 in the direction indicated by the arrow 28 of FIG. 1a. The relative movements of the sprays and the sheets of glass ensure a uniform flow of liquid over the whole of the surfaces of the glass sheets.

The liquid medium, after streaming downwardly across the surfaces and marginal areas of the sheets, falls into a laterally and rearwardly sloping gutter 29 and enters a bottom well 30, from which it is removed by a pump 31. This withdrawn liquid passes through filters 32 which eliminates the coarsest impurities. The substance then passes into a second system of filters (not shown) which by secondary ion exchange on an ion exchange material remove the ions which have entered the medium from the glass. A feed conditioner 33 ensures that the liquid medium has exactly the required composition of salt and any adjuvant before the medium is again supplied to the spraying tubes.

When a basket and its load arrive in front of the partition 19 of the compartment 3, the diffusion treatment is terminated. The partition 19 opens, the basket moves forward into the compartment 4, and partition 19 closes. In compartment 4 the sheets of glass are cooled by coolers 34 and 35 through which a liquid cooling medium flows. When the sheets have cooled to 60° C., a partition 20 opens, the sheets enter the compartment 5, partition 20 closes, and the sheets are unloaded from the basket, which can then return to the loading compartment 1.

In one modified embodiment the basket is given a reciprocating movement in the longitudinal direction of the apparatus, i.e. parallel to arrow 28, thus enabling the compartment 3 to be appreciably shortened and reducing the cost of the installation. By way of example, the diffusion compartment 3 can be 10 meters in length, and the baskets can be moved so as to pass over this length in 24 hours. The mean forward speed is therefore 7 mm. per minute. At the same time, the baskets may be given a reciprocating movement parallel to their direction of advance, the speed of the reciprocating movement being 7 mm. per second, and its amplitude being 50 cm. so that each complete cycle of the reciprocating movement has a period of about 140 seconds. Up to 1,000 sheets of glass per day can be treated in such an installation by using baskets in which the sheets are held with a spacing of 1 cm. between neighboring sheets.

Figure 4:
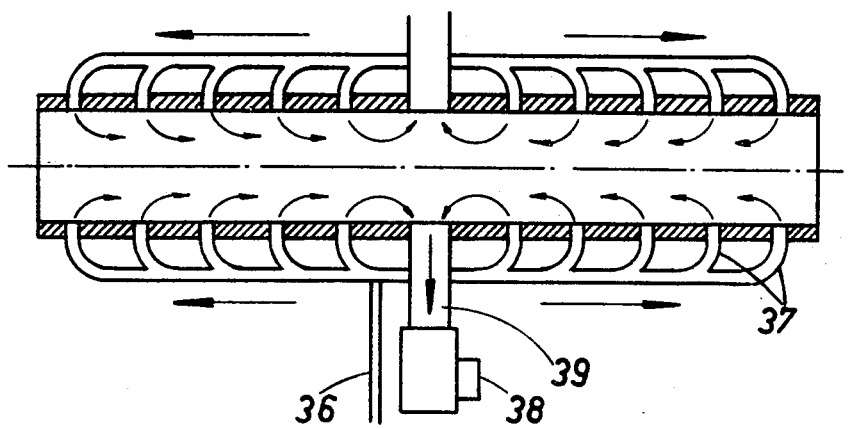
FIG. 4 is a cross-sectional plan view of a portion of another embodiment of the apparatus according to the invention.

In another modified embodiment, a gas such as $CO_2$ is blown into the compartment 3. The compartment can be provided with a gas circulation system as represented in FIG. 4. Gas is blown into the compartment from a conduit 36 and is distributed over the whole length of the compartment 3 by means of pipes 37 disposed along walls 10. The gas is blown onto the surface of the sheets of glass, where it reacts with the treatment substance—in the present case $KNO_3$—thus activating the diffusion of the $K^+$ ions into the surface of the sheets of glass. The gas is then sucked out by a fan 38 mounted on a central pipe 39.

Figure 5:
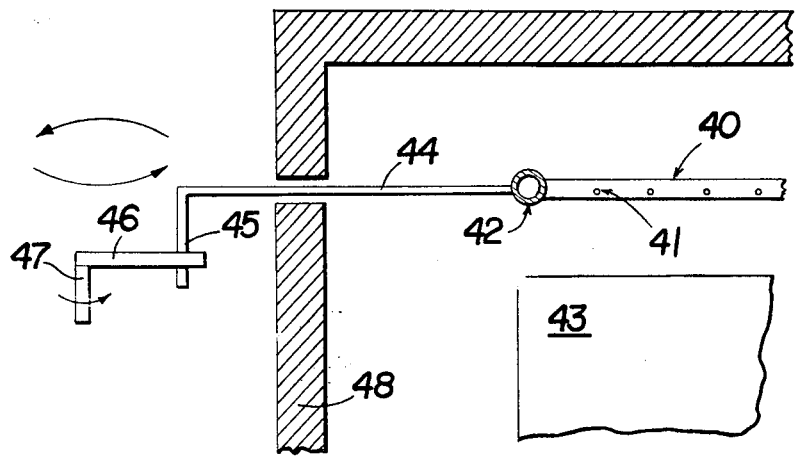
FIG. 5 is a cross-sectional elevational view of a portion of still another embodiment of the apparatus according to the invention.

According to another embodiment, sprinkler heads providing molten salt to the sheets describe closed paths above the sheets. As shown in FIG. 5, sprinkler tubes 40, each provided with holes 41 are connected to a main distribution pipe 42 which in turn is connected, by means of a flexible to a fixed salt feeding tube not shown; the whole system of pipe 42 and sprinkler tubes 40 describes a circular path above the sheets of glass 43 to be sprinkled. This movement is obtained by means of two or more links, only one of which is shown in 44 fixed on the main distribution pipe 42; the links are connected by crankpins like 45, which describe circular movements by means of a crank 46 mounted on an axle 47, imposing the movement to the system. The axles 47 are driven by a motor not shown. Links as 44 pass through the upper part of the lateral wall 48 of the treatment tank. Treatment with an apparatus as here described promotes largely the homogeneity of the treatment on the whole surface of the sheets.

It will be understood that the above description of the present invention is susceptible to various modifications, changes and adaptations.

I claim:

1. In a process for chemically tempering a body of a material containing at least one uniformly distributed vitreous phase at its surface by contacting the body with a liquid treatment medium from which alkali ions of at least one type enter the body in exchange for exchangeable alkali ions of a different size initially in the body, while controlling the temperature of the body so as to cause such exchange to create compressive surface stresses in the body, the improvement wherein said step of contacting is carried out by disposing the body in a non-liquid environment, and projecting a continuous supply of the liquid medium against the body at a flow rate sufficient to cause a continuous stream of the medium to flow across the body, for continuously renewing the medium in contact with the body.

2. A process as defined in claim 1 wherein said step of contacting is carried out by delivering at least one jet of the medium to the body.

3. A process as defined in claim 2 comprising the further step of displacing the body relative to the jet.

4. A process as defined in claim 3 wherein said step of displacing is carried out by creating a relative reciprocating movement between the jet and the body.

5. A process as defined in claim 4 wherein said step of displacing further comprises moving the body unidirectionally relative to the jet and said reciprocating movement is in a direction transverse to such unidirectional movement.

6. A process as defined in claim 4 wherein said step of displacing further comprises moving the body unidirectionally relative to the jet, and said reciprocating movement is parallel to the direction of such unidirectional movement.

7. A process as defined in claim 1 wherein said step of contacting is carried out so as to cause different portions of the surface of the body to receive different amounts of the liquid medium per unit time.

8. A process as defined in claim 1 wherein said step of contacting is carried out by causing different portions of the surface of the body to receive liquid media having different characteristics.

9. A process as defined in claim 1 comprising the further step of, during said contacting step, bringing into the presence of the body a gaseous fluid having at least one component which influences the entry of the at least one substance into the body, the component being selected from the group consisting of $H_2O$, $SO_2$, $SO_3$ and a halogen.

10. A process as defined in claim 9 wherein the component is of a type which weakens the diffusion barrier that normally opposes the entry of the substance to the body.

11. A process as defined in claim 9 comprising the further step of moving the gaseous fluid relative to the body.

12. A process as defined in claim 9 comprising the further step of causing the gaseous fluid to control the temperature of the treatment effected by the liquid medium.

13. A process as defined in claim 1 comprising the further step of, during said contacting step, subjecting at least a portion of the body to the action of an electric field.

14. A process as defined in claim 13 wherein the electric field has at least an alternating component.

15. A process as defined in claim 1 comprising the further steps of recovering the liquid medium after it has flowed across the body, and subsequently recycling the medium.

16. A process as defined in claim 15 wherein said step of recycling includes regenerating the medium before it is re-used.

17. A process as defined in claim 1 wherein the body is constituted by a sheet of glass.

References Cited

UNITED STATES PATENTS

| | | | |
|---|---|---|---|
| 3,493,357 | 2/1970 | Agett et al. | 65—348 |
| 3,287,201 | 11/1966 | Chisholm et al. | 65—30 X |
| 3,078,693 | 2/1963 | Lytle | 65—60 |
| 3,467,508 | 9/1969 | Loukes et al. | 65—30 |

S. LEON BASHORE, Primary Examiner

R. L. LINDSAY, Jr., Assistant Examiner

U.S. Cl. X.R.

65—60, 114, 348; 117—124 B